(12) United States Patent
Wilkinson et al.

(10) Patent No.: US 10,615,412 B2
(45) Date of Patent: Apr. 7, 2020

(54) MANGANESE OXIDE COMPOSITION AND METHOD FOR PREPARING MANGANESE OXIDE COMPOSITION

(71) Applicant: The University of British Columbia, Vancouver (CA)

(72) Inventors: David P. Wilkinson, North Vancouver (CA); Arman Bonakdarpour, Vancouver (CA); Ivan Stosevski, Vancouver (CA)

(73) Assignee: Octopus Technologies Inc., Vancouver (CA)

( * ) Notice: Subject to any disclaimer, the term of this patent is extended or adjusted under 35 U.S.C. 154(b) by 0 days.

(21) Appl. No.: 15/957,913

(22) Filed: Apr. 20, 2018

(65) Prior Publication Data

US 2019/0237762 A1 Aug. 1, 2019

Related U.S. Application Data

(60) Provisional application No. 62/624,105, filed on Jan. 30, 2018.

(51) Int. Cl.
| | |
|---|---|
| *H01M 4/04* | (2006.01) |
| *H01M 4/131* | (2010.01) |
| *H01M 4/50* | (2010.01) |
| *H01M 4/505* | (2010.01) |
| *H01M 6/04* | (2006.01) |
| *H01M 10/0525* | (2010.01) |
| *H01M 4/1391* | (2010.01) |
| *H01M 4/08* | (2006.01) |
| *H01M 4/02* | (2006.01) |

(52) U.S. Cl.
CPC ......... *H01M 4/505* (2013.01); *H01M 4/0438* (2013.01); *H01M 4/08* (2013.01); *H01M 4/131* (2013.01); *H01M 4/1391* (2013.01); *H01M 4/50* (2013.01); *H01M 6/04* (2013.01); *H01M 10/0525* (2013.01); *H01M 2004/028* (2013.01)

(58) Field of Classification Search
CPC .... H01M 4/131; H01M 4/1391; H01M 4/505; H01M 10/0525; H01M 2004/028; H01M 4/0438; H01M 4/08; H01M 4/50; H01M 6/04
See application file for complete search history.

(56) References Cited

U.S. PATENT DOCUMENTS

| | | | | |
|---|---|---|---|---|
| 2002/0192553 A1* | 12/2002 | Barker | .................. | C01B 25/455 429/224 |
| 2003/0044346 A1* | 3/2003 | Kumar | ................... | B82Y 30/00 423/593.1 |
| 2013/0017442 A1* | 1/2013 | Cha | ........................ | H01M 4/505 429/211 |
| 2013/0230774 A1* | 9/2013 | Ortega | .................... | H01M 4/50 429/221 |
| 2013/0236813 A1* | 9/2013 | Heo | ..................... | H01M 8/1016 429/491 |
| 2017/0104363 A1* | 4/2017 | Mukherjee | .............. | H01M 4/38 |

FOREIGN PATENT DOCUMENTS

| | | | |
|---|---|---|---|
| JP | 2009-218205 | * | 9/2009 |
| JP | 2017-022069 | * | 1/2017 |
| WO | WO 2012/167010 | * | 12/2012 |
| WO | WO 2013/112660 | * | 8/2013 |

OTHER PUBLICATIONS

Machine translation of JP 2017-022069, published on Jan. 26, 2017 (Year: 2017).*
Machine translation of JP 2009-218205, published on Sep. 24, 2009 (Year: 2009).*

* cited by examiner

*Primary Examiner* — Anca Eoff
(74) *Attorney, Agent, or Firm* — IP Attorneys Group, LLC

(57) ABSTRACT

The present application relates to a method comprising: (a) providing a battery comprising a manganese oxide composition as a primary active material; and (b) cycling the battery by: (i) galvanostatically discharging the battery to a first $V_{cell}$; (ii) galvanostatically charging the battery to a second $V_{cell}$; and (iii) potentiostatically charging at the second $V_{cell}$ for a first defined period of time. The present application also relates to a chemical composition produced by the method above. The present application also relates to a battery comprising a chemical composition having an X-ray diffractogram pattern expressing a Bragg peak at about 26°, said peak being of greatest intensity in comparison to other expressed Bragg peaks. The present application also relates to a battery comprising one or more chemical species, the one or more chemical species produced by cycling an activated composition.

15 Claims, 16 Drawing Sheets

MANGANESE OXIDE COMPOSITION AND METHOD FOR PREPARING MANGANESE OXIDE COMPOSITION

CROSS-REFERENCE

This patent application claims priority to U.S. Provisional Patent Application Ser. No. 62/624,105 filed Jan. 30, 2018.

TECHNICAL FIELD

The present disclosure relates to a manganese oxide composition and method or preparing manganese oxide composition. The present disclosure also relates to a rechargeable battery comprising a manganese oxide composition or a cycled composition.

BACKGROUND

Manganese oxide compositions are inorganic compositions that may be used in industrial applications such as in (but not limited to) battery or pigment manufacturing, or that serve as precursor materials to other compositions comprising manganese. Despite their natural occurrence, manganese oxide compositions utilized in commercial applications are commonly produced by either chemical means or electrolytic means.

An example of a manganese oxide composition is manganese dioxide ($MnO_2$). Like many inorganic compounds, manganese dioxide exists in different polymorphs or phases. Such polymorphs include, but are not limited to, $\alpha$-$MnO_2$, $\beta$-$MnO_2$ (pyrolusite), $\gamma$-$MnO_2$ (ramsdellite), and $\varepsilon$-$MnO_2$ (akhtenskite). Polymorphs present in electrolytically synthesized $MnO_2$ often display a high degree of crystallinity. Electrolytically synthesized $MnO_2$ may be referred herein as "EMD".

Another example of a manganese oxide composition is manganese (II, III) oxide, Manganese (II, III) oxide is present in nature in the mineral hausmannite, and may be used as a precursor material in the production of ceramic materials such as, but not limited to, magnets. The various chemical formulae of manganese (II, III) oxides may be generally identified as $Mn_3O_4$.

Another example of a manganese oxide composition is $Mn_2O_3$, which is present in nature in the mineral bixbyite.

Owing to the relative abundance, low toxicity, and low cost of manganese dioxide, manganese dioxide is commonly used in the production of alkaline zinc-ion batteries (e.g. alkaline $Zn/MnO_2$ batteries); alkaline $Zn/MnO_2$ batteries themselves occupy a significant portion of the battery market share. In general, alkaline $Zn/MnO_2$ batteries comprise a cathode (i.e., one that comprises manganese dioxide as an cathodic active material), an anode (i.e., one that comprises zinc metal as an anodic active material), and an alkaline electrolytic solution (e.g., a potassium hydroxide solution) with which both the cathode and the anode are in fluid communication.

During operation of an alkaline $Zn/MnO_2$ battery, zinc anodic material is oxidized, cathodic active material is reduced, and an electric current directed towards an external load is generated. Upon recharging such battery, by-products formed as a result of the reduction manganese dioxide are oxidized to re-form manganese dioxide. Products containing manganese that are produced in a typical discharge/charge cycle of a commercial $Zn/MnO_2$ battery are described in Shoji et al., *Charging and discharging behaviour of zinc-manganese dioxide galvanic cells using zinc sulfate as electrolyte*, J. Electroanal. Chem., 362 (1993): 153-157.

In an alkaline $Zn/MnO_2$ battery, it has been observed that the alkaline electrolytic environment therein contributes, over time and over a discharge/charge cycling process, to an accumulation of by-products such as, but not limited to, $Mn(OH)_2$, $Mn_3O_4$, and $Mn_2O_3$ formed on the cathode (Shen et al., *Power Sources*, 2000, 87, 162). Accumulation of such by-products in $Zn/MnO_2$ batteries may lead to undesirable consequences such as capacity fading, poor Coulombic efficiencies, or both. "Consumed" $Zn/MnO_2$ batteries comprising such accumulated by-products are often simply discarded or recycled, and often without further consideration to the potential commercial and/or industrial utility of the accumulated by-products themselves.

SUMMARY

According to an aspect of the invention, there is a method comprising: (a) providing a battery comprising: (i) a cathode containing a manganese oxide composition as a primary cathodic active material; (ii) an anode; (iii) an electrolytic solution in fluid communication with the anode and the cathode, and (b) cycling the battery by: (i) galvanostatically discharging the battery to a first $V_{cell}$; (ii) galvanostatically charging the battery to a second $V_{cell}$; and (iii) potentiostatically charging at the second $V_{cell}$ for a first defined period of time.

The method may have a first $V_{cell}$ between 1.0V and 1.2V. The method may lave a second $V_{cell}$ between 1.8V and 2.0V.

According to another aspect of the invention, there is a method comprising: (a) providing a battery comprising: (i) a cathode containing a manganese oxide composition as a primary cathodic active material; (ii) an anode; (iii) an electrolytic solution in fluid communication with the anode and the cathode; and (b) cycling the battery by: (i) galvanostatically discharging the battery to a first $V_{cell}$; (ii) potentiostatically charging the battery at a second $V_{cell}$ for a first defined period of time; (iii) galvanostatically charging the battery to a third $V_{cell}$; and (iv) potentiostatically charging at the third $V_{cell}$ for a second defined period of time.

The method may have a first $V_{cell}$ between 1.0V and 1.2V. The method may have a second between 1.7V and 1.8V. The method may have a third $V_{cell}$ between 1.8V and 2.0V.

According to another aspect of the invention, there is a chemical composition that is produced by a method described above. The chemical composition may be used for the manufacture of a battery. The battery may be a zinc-ion battery.

According to another aspect of the invention, there is a chemical con position having an X-ray diffractogram pattern expressing a Bragg peak at about 26°, said peak being of greatest intensity in comparison to other expressed Bragg peaks. The chemical composition may be used for the manufacture of a battery. The battery may be a zinc-ion battery.

The X-ray diffractogram pattern of the chemical composition may further express Bragg peaks at 18° and 34°. The Bragg peak at 34° may be greater in intensity than the Bragg peak 18°. The X-ray diffractogram pattern of the chemical composition may further express Bragg peaks at 36° and 44°. The Bragg peak at 36° may be greater in intensity than the Bragg peak at 44°. The chemical composition may be produced by cycling $Mn_3O_4$.

According to another aspect of the invention, there is a chemical composition comprising one or more chemical species produced by cycling an activated composition. The chemical composition may be used for the manufacture of a battery. The battery may be a zinc-ion battery.

The activated composition may be produced by treating $LiMn_2O_4$.

At least one of the one or more chemical species may have a chemical formula of $M_xMn_yO_z$, wherein "x" is between 0.01 and 1, wherein "y" is 2, and wherein "z" is 4. The at least one of the one or more chemical species may have a spinal crystalline structure. "M" in the chemical formula $M_xMn_yO_z$ may be selected from the group consisting of alkali metals and alkaline earth metals. The alkali metals may be selected from lithium, sodium, potassium, rubidium. The alkali metal may be lithium.

At least one of the one or more chemical species may be ramsdellite.

This summary does not necessarily describe the entire scope of all aspects of the disclosure. Other aspects, features and advantages will be apparent to those of ordinary skill in the art upon review of the following description of specific embodiments.

BRIEF DESCRIPTION OF THE DRAWINGS

In the accompanying drawings, which illustrate one or more embodiments.

Figure 1:
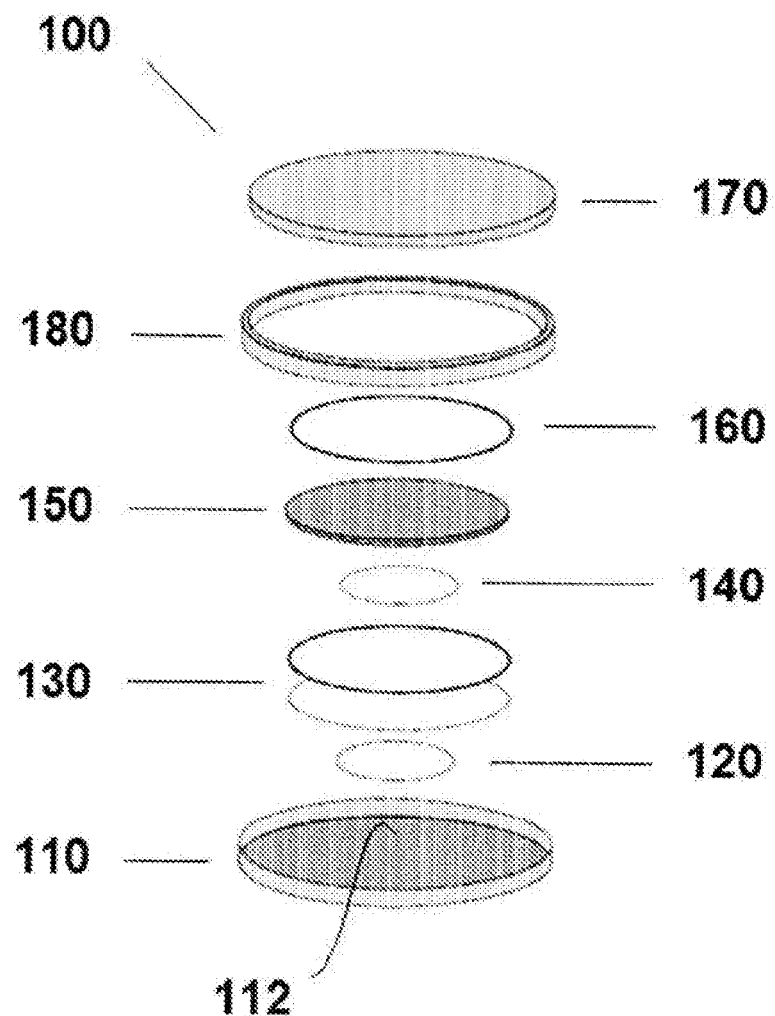
FIG. 1 is an exploded view of a coin cell for cycling, a manganese oxide composition.

Where applicable on XRD diffractograms, Miller indices have been included.

DETAILED DESCRIPTION

Directional terms such as "top," "bottom," "upwards," "downwards," "vertically," and "laterally" are used in the following description for the purpose of providing relative reference only, and are not intended to suggest any limitations on how any article is to be positioned during use, or to be mounted in an assembly or relative to an environment. The use of the word "a" or "an" when used herein in conjunction with the term "comprising" may mean "one," but it is also consistent with the meaning of "one or more," "at least one" and "one or more than one." Any element expressed in the singular form also encompasses its plural form. Any element expressed in the plural form also encompasses its singular form. The term "plurality" as used herein means more than one; for example, the term "plurality includes two or more, three or more, four or more, or the like.

In this disclosure, the terms "comprising", "having", "including", and "containing", and grammatical variations thereof, are inclusive or open-ended and do not exclude additional un-recited elements and/or method steps. The term "consisting essentially of" when used herein in connection with a composition, use or method, denotes that additional elements, method steps or both additional elements and method steps may be present but that these additions do not materially affect the manner in which the recited composition, method, or use functions. The term "consisting of" when used herein in connection with a composition, use, or method, excludes the presence of additional elements and/or method steps.

In this disclosure, the term "about", when followed by a recited value, means within plus or minus 5% of that recited value.

In this disclosure, the term "activated composition" refers to a composition that results, from a treatment (e.g., electrochemical, chemical, thermal, combination thereof) of an $M_xMn_yO_z$ composition.

In this disclosure, the term "active material" refers to a cathodic or anodic chemically reactive material that participates in a charge or discharge reaction.

In this disclosure, the term "battery" contemplates an electrochemical cell or two or more electrochemical cells connected together in series, in parallel, or a combination thereof. As used herein, the term "cell" contemplates an electrochemical cell or two or more electrochemical cells connected together in series, in parallel, or a combination thereof. As used herein, the terms "battery" and "cell" are interchangeable.

In this disclosure, a "C rate" refers to a rate at which a battery is discharged. For example, a 2 C rate would discharge an entire electrode in 30 minutes, a 1 C rate would discharge an entire electrode in 1 hour, a C/2 rate would discharge an entire electrode in 2 hours, and a C/10 rate would discharge an entire electrode in 10 hours.

In this disclosure, the term "cut-off capacity" or "capacity cut-off" refers to a coulometric capacity at which a discharge step of a battery is stopped.

In this disclosure, the term "cut-off voltage" or "voltage cut-off" refers to a voltage of a battery at which: (i) a discharge step is stopped; or (ii) a charge step is stopped.

In this disclosure, the term "cycled composition" means a manganese oxide composition that has been subjected to a discharge reaction, a charge reaction, a combination thereof, or a plurality thereof.

In this disclosure, the term "cycled electrode" means an electrode initially comprising a manganese oxide composition acting as an active material, the electrode having been subjected to a discharge reaction, a charge reaction, a combination thereof, or a plurality thereof.

In this disclosure, the term "discharged state" (of a battery) means a state of a battery where at least a portion of the cathodic manganese oxide composition of the battery has participated in a discharge reaction.

In this disclosure, the term "$M_xMn_yO_z$ composition" refers a composition having a chemical formula of $M_xMn_yO_z$, wherein "M" is a metal other than Mn, wherein "x" and "y" and "z" are numbers, wherein "y" and "z" are greater than 0, and wherein "x" is 0 or greater. For example, "M" may be an alkali metal or an alkaline earth metal. Examples of alkali metals include Li, Na, K, and Rb. Examples of alkaline earth metals include Be, Mg, Ca, and Sr. For example, "M" may also be a transition metal. Examples of transition metals include Sc, Ti, V, Cr, Fe, Co, Ni, Cu, Zn, Y, Zr, Nb, Mo, Tc, Ru, Rh, Pd, Ag, and Cd. For example, "M" may be selected from the group consisting of Fe, Co, Ni, Cu, and Zn. For example, "M" may be selected from the group consisting of Li, Na, K, and Zn. A non-limiting example of an $M_xMn_yO_z$ composition is a composition having the formula $Mn_3O_6$, wherein "a" and "b" are greater than 0.

In this disclosure, the term "manganese oxide composition" includes an activated composition and an $M_xMn_yO_z$ composition.

In this disclosure, the term "un-cycled state" (of a battery) means a state of a battery where a cathodic $M_xMn_yO_z$ composition of the battery has not undergone a charge reaction or a discharge reaction.

The present disclosure relates to a manganese oxide composition and method or preparing manganese oxide composition. The present disclosure also relates to rechargeable battery comprising a manganese oxide composition or a cycled composition. The rechargeable battery may be a zinc-ion battery.

The teachings provided in this disclosure are illustrated by primarily using the examples disclosed herein. Nonetheless, a skilled person would understand that this disclosure is not limited to those examples, and would understand that the teachings herein may be applied to manganese oxide compositions generally. Different forms of manganese oxide compositions such as, but not limited to, chemically synthesized oxides, manganese oxide compositions that are doped, and manganese oxide compositions that are not doped, may be activated, cycled, or generally prepared in a manner that is the same as or similar to any teaching disclosed herein.

Manganese Oxide Powder

Manganese oxide compositions may be of any suitable physical form (e.g., powder, sheet, thin film, films produced by physical or chemical vapour deposition). Manganese oxide compositions in powder form may be referred to herein as "manganese oxide powder". Manganese oxide powder may be a powder of an $M_xMn_yO_z$ composition, a powder of an activated composition, or a combination thereof.

In some embodiments, an activated composition (e.g. such as one in powder form) is created by chemically treating an $M_xMn_yO_z$ composition (e.g. such as one in powder form). Such activated composition may be partially de-metallized. Such activated composition may be fully de-metallized. In chemically treating an $M_xMn_yO_z$ composition, the $M_xMn_yO_z$ composition is mixed in a strong acid solution at elevated temperatures for a pre-defined period of time after which the resulting product is washed (for example with deionized water). The strong acid may be any suitable strong acid. Examples of strong acids include, but are not limited to, HCl, $H_2SO_4$, $HNO_3$, $HClO_3$, $HClO_4$. In some embodiments, the strong acid is $H_2SO_4$.

The concentration of the strong acid may be any suitable concentration. For example, the concentration of the strong acid can be 1.0M, 1.5M, 2.0M, 2.5M, 3.0M, 3.5M, or 4.0M. For example, the strong acid solution can be a 2.5M sulfuric acid solution.

Elevated temperatures include, but are not limited to, any temperature between about 80° C. and about 120° C., about 90° C. and about 110° C., about 95° C. and about 105° C. For example, the elevated temperature can be 95° C.

The pre-defined period of time may be any suitable time period for drying. For example, the predefined period of time may be 2 hours or longer, 3 hours or longer, 4 hours or longer. For example, the pre-defined period of time can be 2.5 hours.

The resulting product is then dried at elevated temperatures for a pre-defined period of time. Elevated temperatures include, but are not limited to, any temperature between about 80° C. and about 120° C., about 90° C. and about 110° C. about 95° C. and about 105° C. For example, the elevated temperature can be 100° C. The pre-defined period of time may be any suitable time period for drying. For example, the pre-defined period of time may be 2 hours or longer, 3 hours or longer, 4 hours or longer. In an example, the pre-defined period of time is 12 hours.

In other embodiments, an activated composition (e.g. such as one in powder form) is created by electrochemically treating an $M_xMn_yO_z$ composition (e.g. such as one in powder form).

In other embodiments, an $M_xMn_yO_z$ composition does not undergo chemical treatment, electrochemical treatment, or any other treatment.

Manganese Oxide Electrode

Manganese oxide powder may be combined with a current collector to form an electrode. Manganese oxide compositions in other physical forms (e.g. sheet, thin films, films produced by physical or chemical vapour deposition) may also be combined with a current collector to form an electrode. Such an electrode may be referred to as a "manganese oxide electrode" herein.

According to an embodiment of preparing a manganese oxide electrode, manganese oxide powder is mixed with carbon black (e.g. Vulcan® XC72R) and added to a 7 wt % polyvinylidene fluoride (e.g. EQ-Lib-PVDF, MTI Corporation) and n-methyl-2-pyrrolidone (e.g. EQ-Lib-NMP, MTI Corporation) based solution, to form a mixture. The mixture is spread onto a carbon paper current collector substrate (e.g. TGP-H-12 carbon paper). The mixture is dried on the substrate at about 150° C. for about 2 hours. Upon drying, a manganese oxide electrode is formed.

The ratio of manganese oxide powder to carbon black to PVDF may vary. In an example, the ratio is about 7:2:1.

The current collector substrate can be a substantially 2-D structure or a 3-D structure. The current collector substrate can have different degrees of porosity (e.g., 5% to 70%) and tortuosity. In some embodiments, the current collector substrate can be a metal, an alloy, or metal oxide. Examples of suitable metals or alloys include, but are limited to, nickel, stainless steel, titanium, tungsten, and nickel-based alloys. In other embodiments, other carbon supports for the current collector substrate can be used. Such carbon supports include, but are not limited to, carbon nanotube, modified carbon black, activated carbon. In other embodiments, other current collector substrates can be used. Such substrates include, but are not limited to, 3-D structured carbon, porous carbons and nickel metal meshes.

In other embodiments, polyvinylidene fluoride solutions comprising other wt % of polyvinylidene fluoride can be used. For example such solutions can contain 1-15 wt % of polyvinylidene fluoride.

In other embodiments, other drying temperatures can be used. For example, the drying temperature can be any temperature between about 80° C. and about 180° C. For example, the drying temperature can be between about 80° C. and about 180° C., about 80° C. and about 170° C., about 80° C. and about 150° C., about 90° C. and about 150° C., about 90° C. and about 160° C., about 100° C. and about 150° C. In other embodiments, other drying times can be used. For example, the drying time can be any time between about 2 hours and about 18 hours. For example, the drying time can be about 5 hours and about 18 hours, about 5 hours and about 14 hours, about 5 hours and about 10 hours, and about 5 hours and about 8 hours.

In other embodiments, the ratio of manganese oxide powder to carbon black to PVDF may vary.

In other embodiments, other binders and binder solvents can be used. For example, polyvinyl alcohol (PVA) cross-linked with glutaraldehyde can be used as a binder in the form of water solution. Without being bound by theory, it is believed that PVA increases the hydrophilicity of an electrode, thereby improving battery performance. In another example, styrene-butadiene, which is a rubber based binder can be used. Other binders include, but are not limited to, M-class rubbers and Teflon.

In other embodiments, additives such as, but not limited to, sulfates, hydroxides, alkali metal salts (e.g. salts that dissociate to form $Li^+$, $Na^+$, or $K^+$), alkaline-earth metal salts (e.g. salts that dissociate to form $Mg^{2+}$, or $Ca^{2+}$), transition metal salts, oxides, and hydrates thereof are added during the formation of the electrode. Examples of alkaline-earth metal salts and sulfates include, but are not limited to, $BaSO_4$, $CaSO_4$, $MnSO_4$, and $SrSO_4$. Examples of transition metal salts include, but are not limited to, $NiSO_4$ and $CuSO_4$. Examples of oxides include, but are not limited to, $Bi_2O_3$ and $TiO_2$. In other embodiments, additives such as, but not limited to copper-based and bismuth-based additives are added in the formation of the electrode. Without being bound by theory, it is believed that such additives may improve the cyclability of the battery.

The manganese oxide electrode may be incorporated into the manufacture of a battery. The manganese oxide electrode may be a component of a battery. The manganese oxide electrode may be adapted for use in a battery. The manganese oxide electrode may be used in a battery. In some examples, the battery is a zinc-ion battery.

Cycling of Manganese Oxide Electrode

The manganese oxide composition of a manganese oxide electrode may be cycled in-situ or ex situ of a battery. Below are examples of how a cycled electrode may be prepared.

Referring to FIG. 1, a coin cell 100 is provided. The coin cell 100 comprises an outer casing 110 and a lid 170 that are made of stainless steel (e.g. CR2032 manufactured from MTI Corporation). The outer casing 110 has a base and a sidewall circumscribing the base. The sidewall and the base define an inner cavity 112. The coin cell 100 also comprises a gasket 180 (e.g. O-ring) made of a suitable elastomeric material (e.g. polypropylene), a spacer 150, and a washer 160. The coin cell also comprises a cathode 120, an anode 140, and a separator 130 in between, the cathode 120 and the anode 140, all in fluid contact with (e.g., immersed in) an electrolytic solution. In other examples, other suitable cells may be used.

The cathode 120 (e.g. a manganese oxide electrode that has not be subjected to cycling) is disposed within the inner cavity 112 of the coin cell 100. A near-neutral pH (i.e., the pH is about neutral) electrolytic solution is added into the inner cavity 112 of the coin cell 100 until the cathode 120 is in fluid contact with (e.g. immersed in) the electrolytic solution.

As contemplated herein, the electrolytic solution comprises at least a first electrolytic species. An example of a first electrolytic species is zinc sulfate. Said species may be present in the electrolytic solution in any suitable concentration. Said species may be hydrated or non-hydrated. Non-limiting examples of suitable concentrations include those ranging from about 0.5M to saturation, about 0.5M to about 2.5M, about 1.0M to saturation, about 1.0M to about 2.5M, about 1.5M to saturation, and about 1.5M to about 2.5M; for example, zinc sulfate heptahydrate can be present in solution at a concentration of about 0.5M, 0.8M, 0.7M, 0.8M, 0.9M, 1.0M, 1.1M, 1.2M, 1.3M, 1.4M, 1.5M, 1.6M, 1.7M, 1.8M, 1.9M, 2.0M, 2.1M, 2.2M, 2.3M, 2.4M, 2.5M. In an example, the first electrolytic species is 2.0M of $ZnSO_4.7H_2O$ (e.g. 98% purity from Anachemia Canada Co.).

The first electrolytic species may also be a zinc-based salt such as, but is not limited to, zinc nitrate, zinc chloride, or a combination thereof dissolved in the electrolytic solution at a suitable concentration. The first electrolytic species may also be other about pH neutral electrolytes. Examples of such other near-neutral pH electrolytes include, but are not limited to, those yielding cation species like $Li^+$, $Na^+$ and $Mg^{2+}$ upon disassociation.

The electrolytic solution may further comprise a second electrolytic species. An example of second electrolytic species is manganese sulfate. Said species may be present in the electrolytic solution in any suitable concentration. Said species may be hydrated or non-hydrated. Suitable second electrolytic species concentrations include those ranging from about 0.1M to about 0.2M or saturation; for example, manganese sulfate monohydrate can be present in the electrolytic solution at a concentration of about 0.10M, 0.11M 0.12M, 0.13M 0.14M, 0.15M, 0.16M, 0.17M, 0.18M, 0.19M, 0.20M, or saturation. In an example, the second electrolytic species is about 0.1M of $MnSO_4 \cdot H_2O$ (e.g. 99% purity from Anachemia Canada Co.). In other embodiments, the electrolytic solution comprises another suitable manganese containing compound that has the same or substantially similar function as manganese sulfate monohydrate such as, but not limited to, manganese nitrate.

The electrolytic solution may further comprise additives such as, but not limited to, sulfates, hydroxides, alkali metal salts (e.g. salts that dissociate to form $Li^+$, $Na^+$, or $K^+$), alkaline-earth metal salts (e.g. salts the dissociate to form $Mg^{2+}$, or $Ca^{2+}$), transition metal salts (e.g. copper-based or bismuth-based), oxides, and hydrates thereof can also be added during the formation of the electrode. Examples of alkaline-earth metal salts and sulfates include, but are not limited to, $BaSO_4$, $CaSO_4$, $MnSO_4$, and $SrSO_4$. Examples of transition metal salts include, but are not limited to, $NiSO_4$ and $CuSO_4$. Examples of oxides include, but are not limited to, $Bi_2O_3$ and $TiO_2$. Without being bound by theory, it is behaved that such additives may improve the cyclability of the battery.

The separator 130 is also disposed in the coin cell 100. The separator 130 comprises a first layer and a second layer. As contemplated in this first embodiment, each of the first layer and second layer consists essentially of a sub-layer of cellophane film and a sub-layer of nonwoven polyester fabric (e.g. NWP150 manufactured by Neptco Inc.) coupled thereto. The first layer and second layer are arranged such that the nonwoven polyester fabric sub-layers thereof are adjacent to one another. The separator 130 is disposed on top of the cathode 120 such that the cathode 120 is adjacent to the cellophane sub-layer of the first layer. The separator 130 is in fluid contact with (e.g., immersed in) the electrolytic solution.

The anode 140 comprises a zinc foil (e.g. Dexmet SO31050) and is disposed in the coin cell 100 such that the anode 140 is adjacent to the cellophane film sub-layer of the second layer of the separator 130. Electrolytic solution is added to the coin cell 100 until the anode 140 is in fluid communication therewith.

The spacer 150 is placed adjacent to the anode 140, the washer 160 is placed adjacent to the spacer 150, and the gasket 180 is placed adjacent to the washer 160. The spacer 150 and the washer 160 are made of stainless steel. The outer lid 170 is placed over the gasket 180, and the outer lid 170 and outer casing 110 are crimped together to form the coin cell 100.

According to a first embodiment of preparing (e.g. cycling) a manganese oxide composition of a manganese oxide electrode in-situ of a battery, the coin cell is galvanostatically discharged down to a first $V_{cell}$, potentiostatically charged at a second $V_{cell}$ for a first defined period of time, galvanostatically charged to a third $V_{cell}$, and potentiostatically charged at the third $V_{cell}$ for a second defined period of time. The first $V_{cell}$ may be selected from any voltage between 1.0V and 1.2V. The second $V_{cell}$ may be selected from any voltage between 1.7V and 1.8V. The third $V_{cell}$ may be selected from any voltage between 1.8V and 2.0V. The first defined period of time may be a length of time between 30 minutes and 6 hours. For example the first defined period of time may be 0.5 hours, 1 hour, 1.5 hours, 2 hours, 2.5 hours, 3.0 hours. The second defined period of time may be length of time between 30 minutes and 6 hours. For example the second defined period of time may be 0.5 hours, 1 hour, 1.5 hours, 2 hours, 2.5 hours, 3.0 hours. As contemplated in this first embodiment, the coin cell 200 is galvanostatically discharged at a C/2 rate down to 1.1 $V_{cell}$, potentiostatically charged at 1.75 $V_{cell}$ for two hours, galvanostatically charged at a C/2 rate to 1.9 $V_{cell}$, and potentiostatically charged at 1.9 $V_{cell}$ for two hours. The discharging and charging cycle can be repeated. In other embodiments, the manganese oxide composition of the manganese oxide electrode (or cycled composition of the cycled electrode) is at least in part subjected to galvanostatic charge at a 100 mA/g rate to 1.9 $V_{cell}$ after discharge.

According to a second embodiment of preparing a cycled electrode in-situ of a battery, the coin cell is galvanostatically discharged down to a first $V_{cell}$, galvanostatically charged to a second $V_{cell}$, and potentiostatically charged at the second $V_{cell}$ for a first defined period of time. The first $V_{cell}$ may be selected from any voltage between 1.0V and 1.2V. The second $V_{cell}$ may be selected from any voltage between 1.8V and 2.0V. The first defined time period may be any time period between about 1 minute and 60 minutes, about 5 minutes and 50 minutes, about 10 minutes and 40 minutes. As contemplated in this second embodiment, the coin cell 200 is galvanostatically discharged at a C/2 rate down to 1.1 $V_{cell}$, galvanostatically charged at a C/2 rate (e.g. 100 mA/g) to 1.9 $V_{cell}$, and potentiostatically charged at 1.9 $V_{cell}$ for 10 minutes. The discharging and charging cycle can be repeated.

In other embodiments the manganese oxide composition of a manganese oxide electrode may be cycled ex-situ of a battery, and in a manner similar to in situ cycling. An ex-situ cycled electrode may be incorporated as a component into a battery. The battery may be a zinc-ion battery.

Example 1: $Mn_3O_4$

An example of a manganese oxide composition is a $Mn_3O_4$ composition.

The $Mn_3O_4$ composition may be commercially available. An example of a commercially available $Mn_3O_4$ composition is CMO-CM104B-TOSOH. For reference, an XRD diffractogram of CMO-CM104B-TOSOH is provided at FIG. 2.

Figure 3:
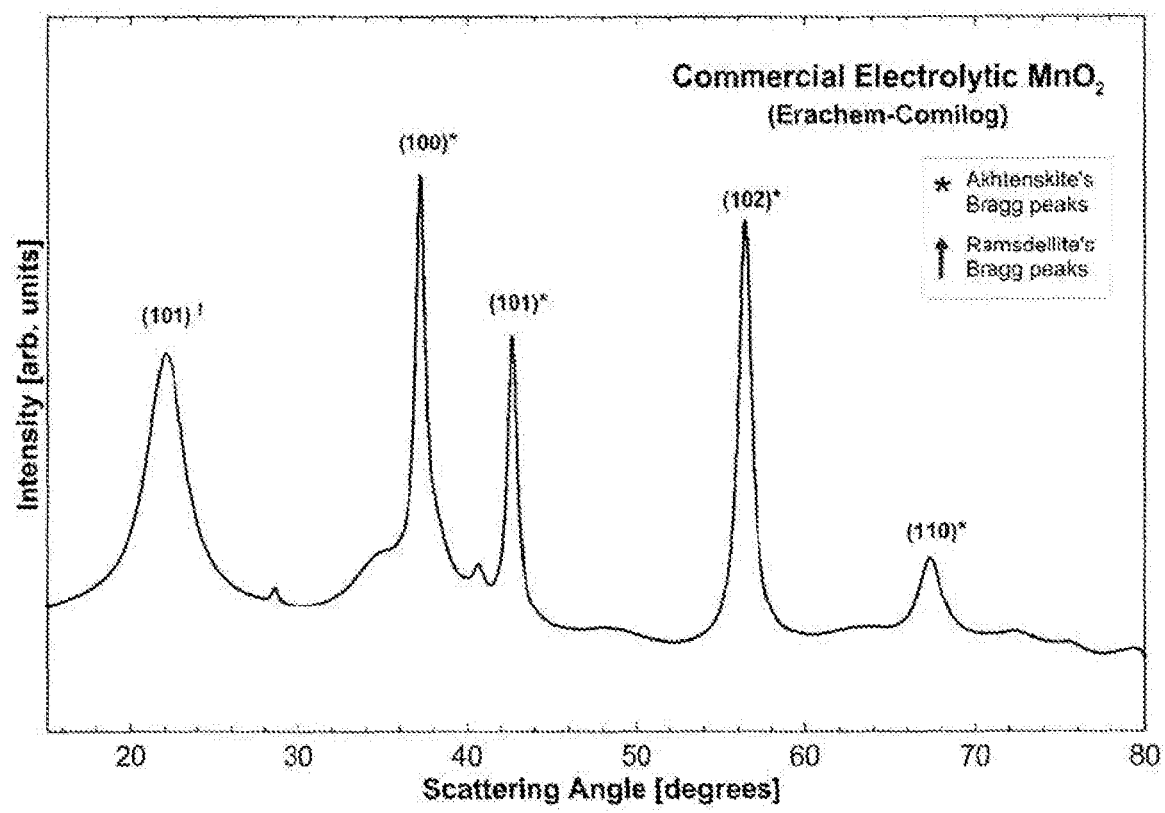
FIG. 3 is an XRD diffractogram of a commercially available EMD (i.e., Erachem-Comilog).
Figure 4:
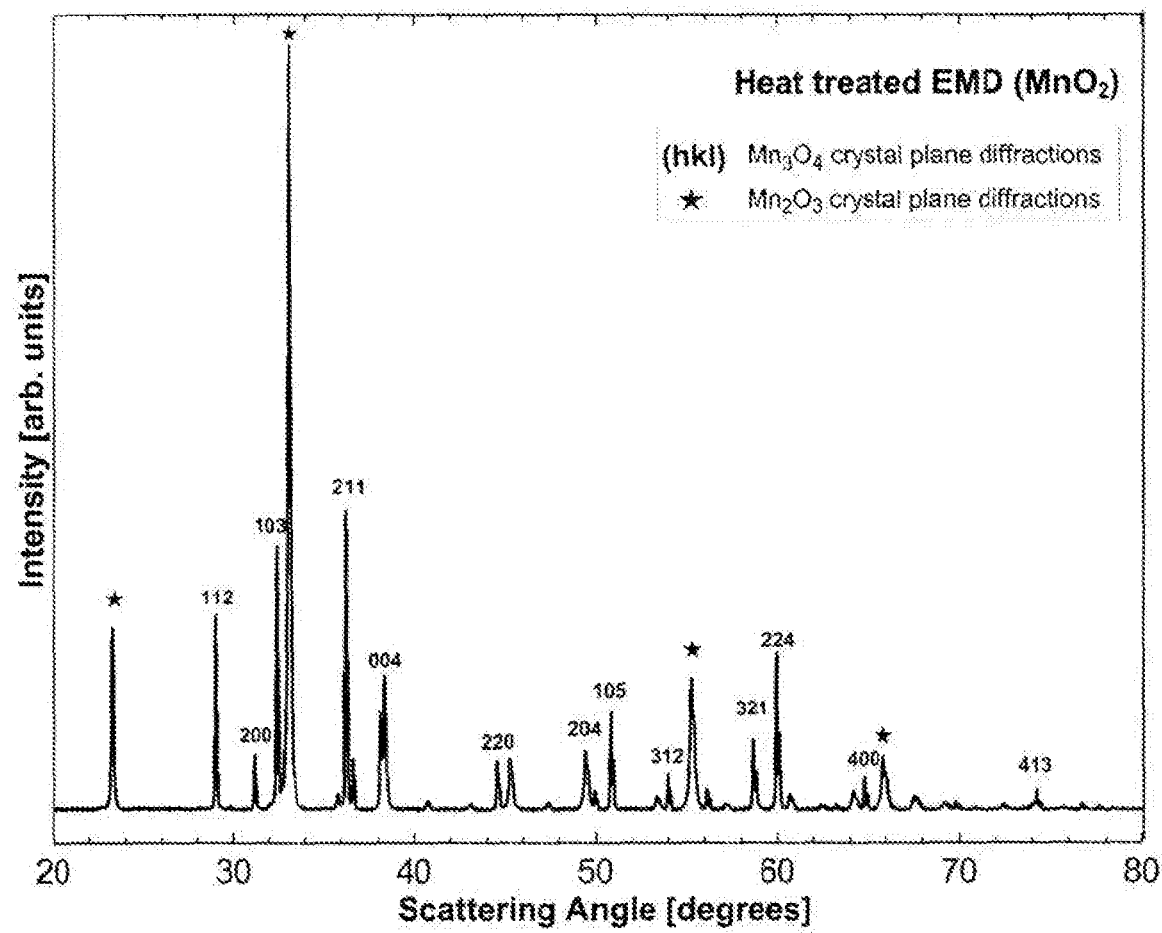
FIG. 4 is an XRD diffractogram of a composition comprising $Mn_3O_4$ and $Mn_2O_3$, the composition produced by heat treating a commercially available EMD (i.e., Erachem-Comilog).

The $Mn_3O_4$ composition may not be commercially available. For example, an $Mn_3O_4$ composition may be produced by heating a commercially available EMD (e.g. Erachem-Comilog commercial EMD, an XRD diffractogram of which is provided at FIG. 3) in an oven at a temperature between about 900° C. and about 960° C. (e.g. 900° C.) for a time period between about 12 hours and about 24 hours (e.g. 12 hours). An XRD diffractogram of the produced $Mn_3O_4$ species (along with a residual impurity of $Mn_2O_3$) is provided at FIG. 4. Residual impurities remaining in the production of the $Mn_3O_4$ composition may be removed by additional heat treatment.

In this example, four different batteries are prepared. Three of the batteries each comprise an electrode, the electrode comprising $Mn_3O_4$ as a cathodic active material. One of the batteries comprises an EMD electrode prepared according to U.S. App. No. 62/583,952, which is incorporated by reference in its entirety herein. Details of each of the prepared batteries are provided in Table 1 as follows:

TABLE 1

| Cell ID | Mn Oxide Type | Loading at the Cathode (mg cm$^{-2}$) | Electrolyte | Discharge cut-off step |
|---|---|---|---|---|
| FCB081_02 | $Mn_3O_4$ | 3.64 | 2M $ZnSO_4$ | 1.1 V |
| FCB081_03 | $Mn_3O_4$ | 0.59 | 2M $ZnSO_4$ | 1.1 V |
| FCB100_02 | $Mn_3O_4$ | 4.45 | 2M $ZhSO_4$ | 100 mAh g$^{-1}$ or 1.1 V |
| SZA056_01 | $MnO_2$ | 3.68 | 2M $ZnSO_4$, 0.1M $MnSO_4$ | 100 mAh g$^{-1}$ or 1.1 V |

Figure 5A:
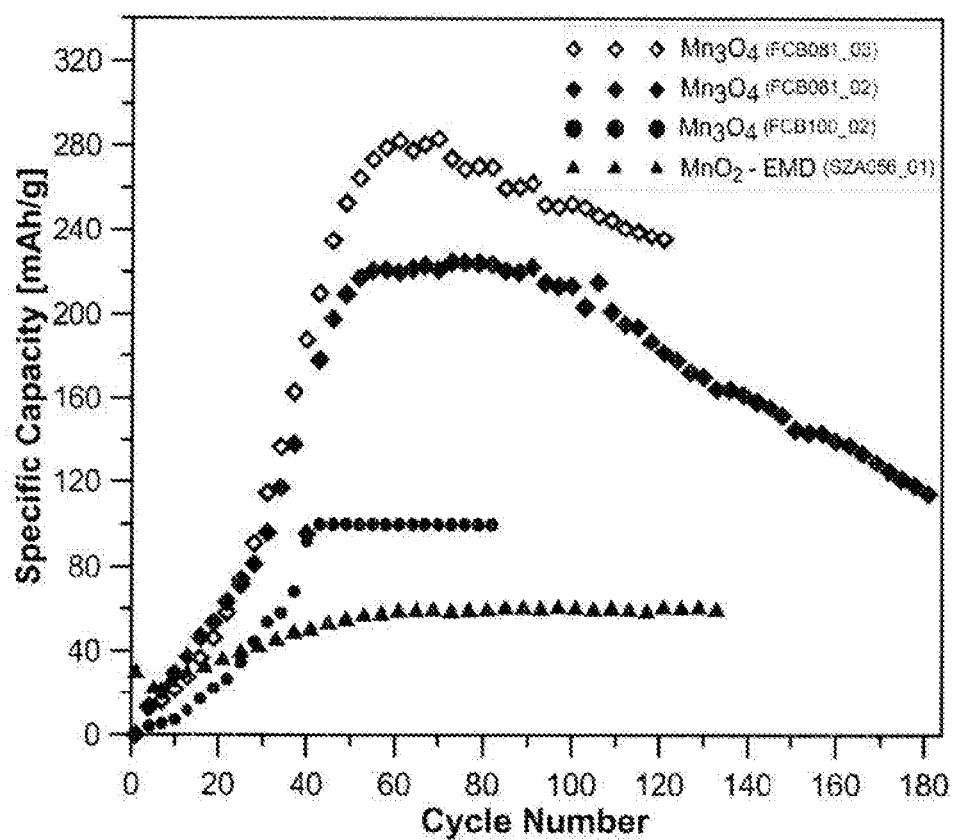
FIG. 5(a) is a sped capacity (mAh/g) versus cycle number plot of various batteries, each battery comprising a cathode, the cathode initially comprising a manganese oxide composition as the primary cathodic active material.

Referring to FIG. 5(a), the initial specific capacities of the batteries in Table 1 prior to cycling are low (i.e. about 0 mAh/g). Specific capacity of each of the batteries described in Table 1 increases with cycling, and specific capacity reaches a pinnacle at about 50 to about 60 cycles.

Figure 5B:
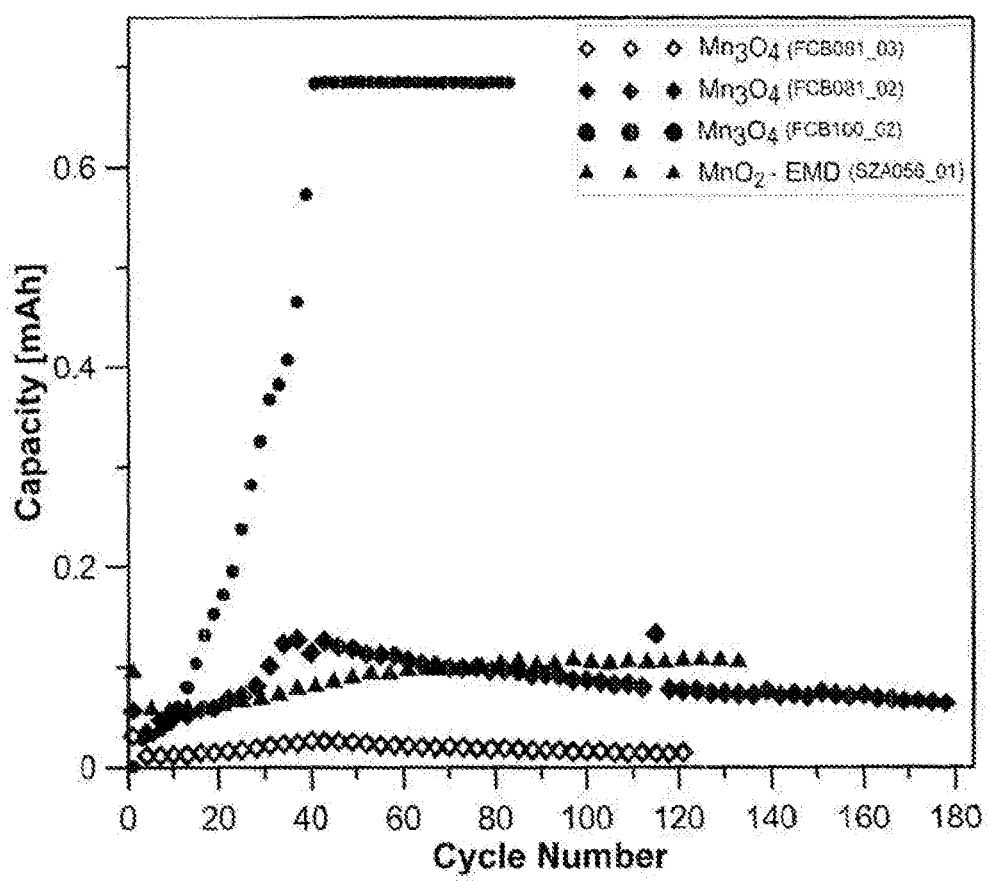
FIG. 5(b) is a capacity (mAh) versus cycle number plot of the various batteries described in FIG. 5(a).

Referring to FIG. 5(b), the capacities of the batteries in Table 1 increase with cycling, and specific capacities reach a pinnacle at about 50 to about 60 cycles.

Figure 5C:
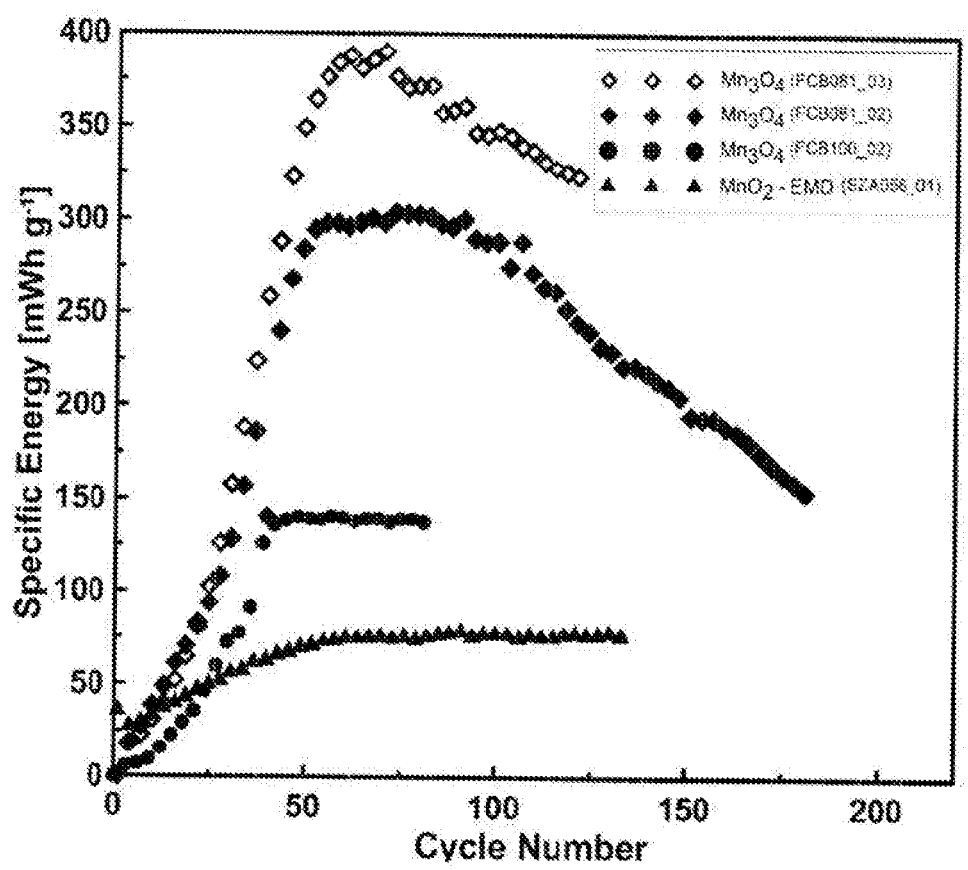
FIG. 5(c) is a specific-energy (mWh $g^{-1}$) versus cycle number plot of the various batteries described in FIG. 5(a).

Referring to FIG. 5(c), the specific energy of the batteries in Table 1 increases with cycling, and specific capacity reaches a pinnacle at about 50 to about 60 cycles.

Figure 5D:
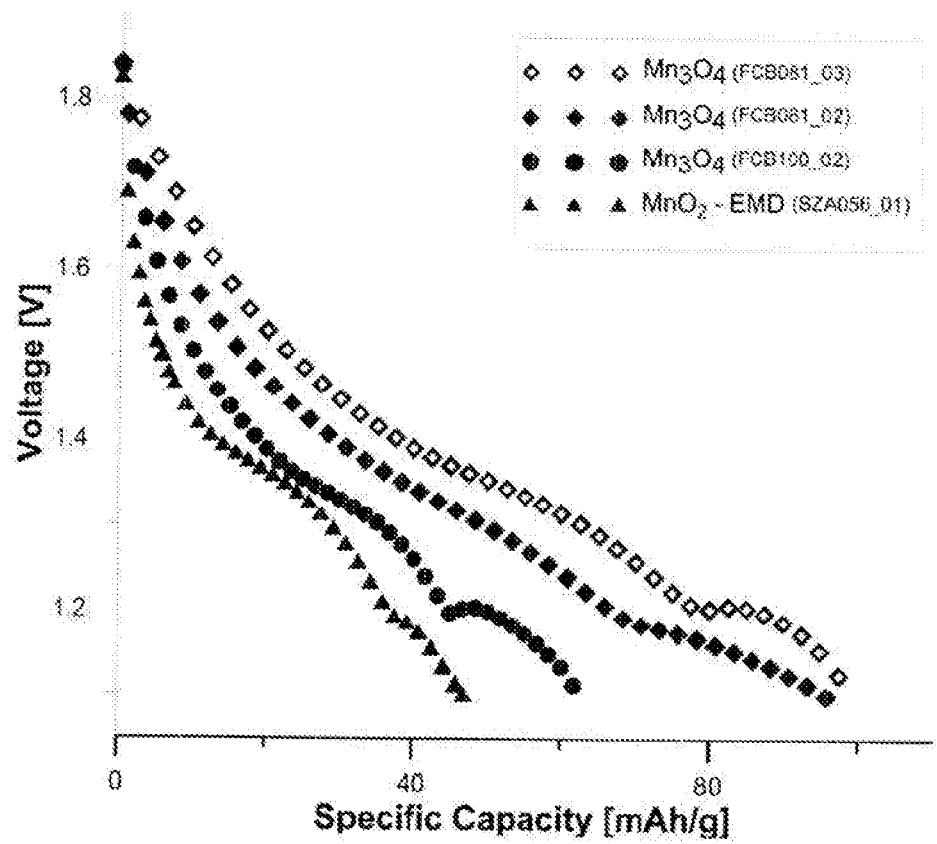
FIG. 5(d) is a voltage versus specific capacity plot of the various batteries described in FIG. 5(a).

Referring to FIG. 5(d), the voltage/capacity profiles of the batteries in Table 1 during the 30th cycle are provided.

Figure 5E:
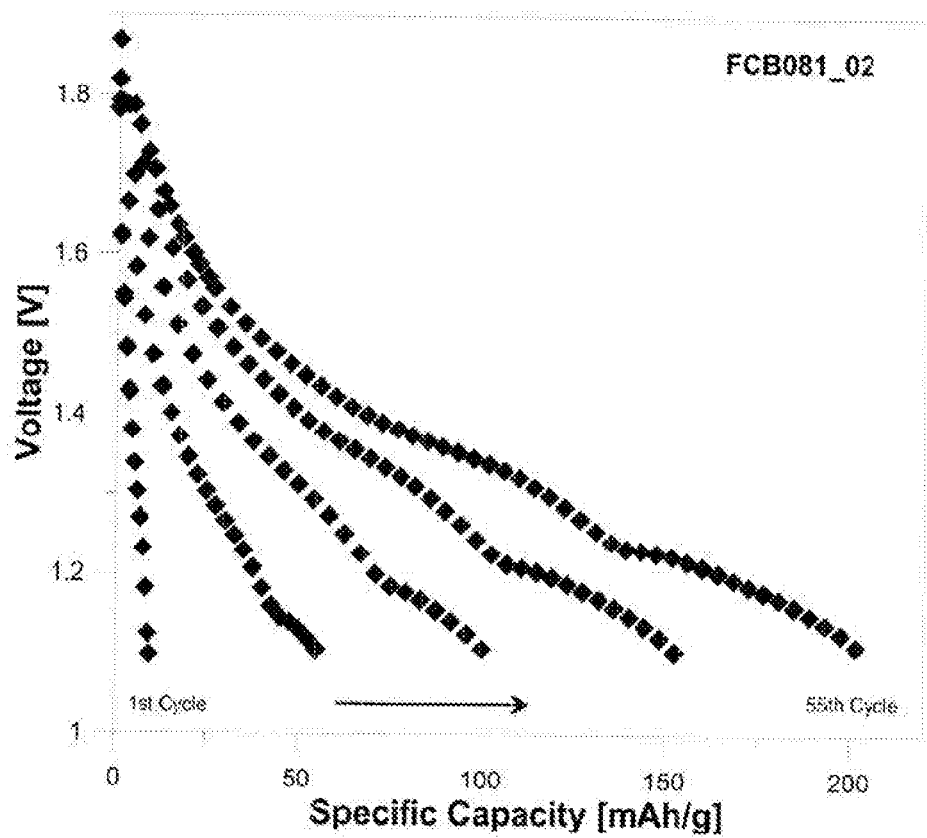
FIG. 5(e) is voltage versus specific capacity plot of a battery (see Cell ID FCB081_02 in FIG. 5(a)) at specific discharge/charge cycles (e.g. 1 cycle, 55 cycles).

Referring to FIG. 5(e), the voltage/capacity profile of Cell ID FCB081_02 at its $1^{st}$ cycle, $14^{th}$ cycle, $28^{th}$ cycle, $42^{nd}$ cycle, and $55^{th}$ cycle are provided. As shown, specific capacity of the battery increases with progressive cycling.

Figure 2:
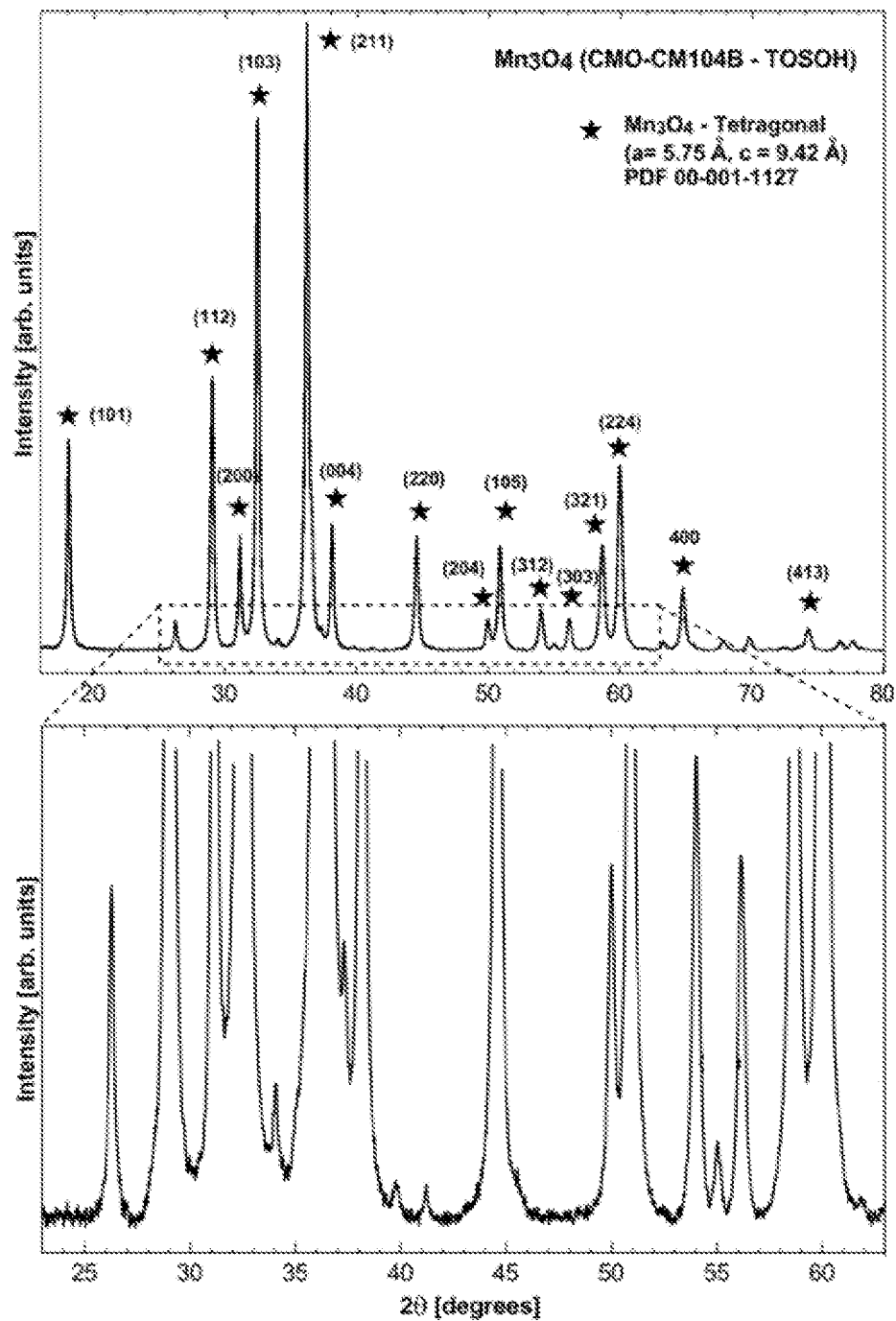
FIG. 2 is an x-ray diffraction (XRD) pattern of a commercially available manganese oxide composition having the chemical formula $Mn_3O_4$, including a magnification of the XRD diffraction pattern between scattering angles of 23 degrees and 63 degrees.

$Mn_3O_4$ (before cycling), and electrodes comprising a cycled composition resulting from subjecting $Mn_3O_4$ to approximately 10 or approximately 20 battery cycles are characterized and analyzed using a X-ray diffraction (XRD) method known in the art. In this example analysis is performed using a Bruker D2 Phaser XRD diffractogram of $Mn_3O_4$ that has not undergone cycling (see FIG. 1) reveals the presence of two tetragonal unit cells of the hausmannite $Mn_3O_4$ phase. The dominant tetragonal phase has unit cell parameters of a=5.75 Å and c=9.42 Å (PDF 00-001-1127). The presence of a small portion of hausmannite's tetragonal phase with the cell parameters of a=8.16 Å and c=9.44 Å (PDF 03-065-2776) is also observed (FIG. 2—magnified portion of XRD pattern).

Figure 6:
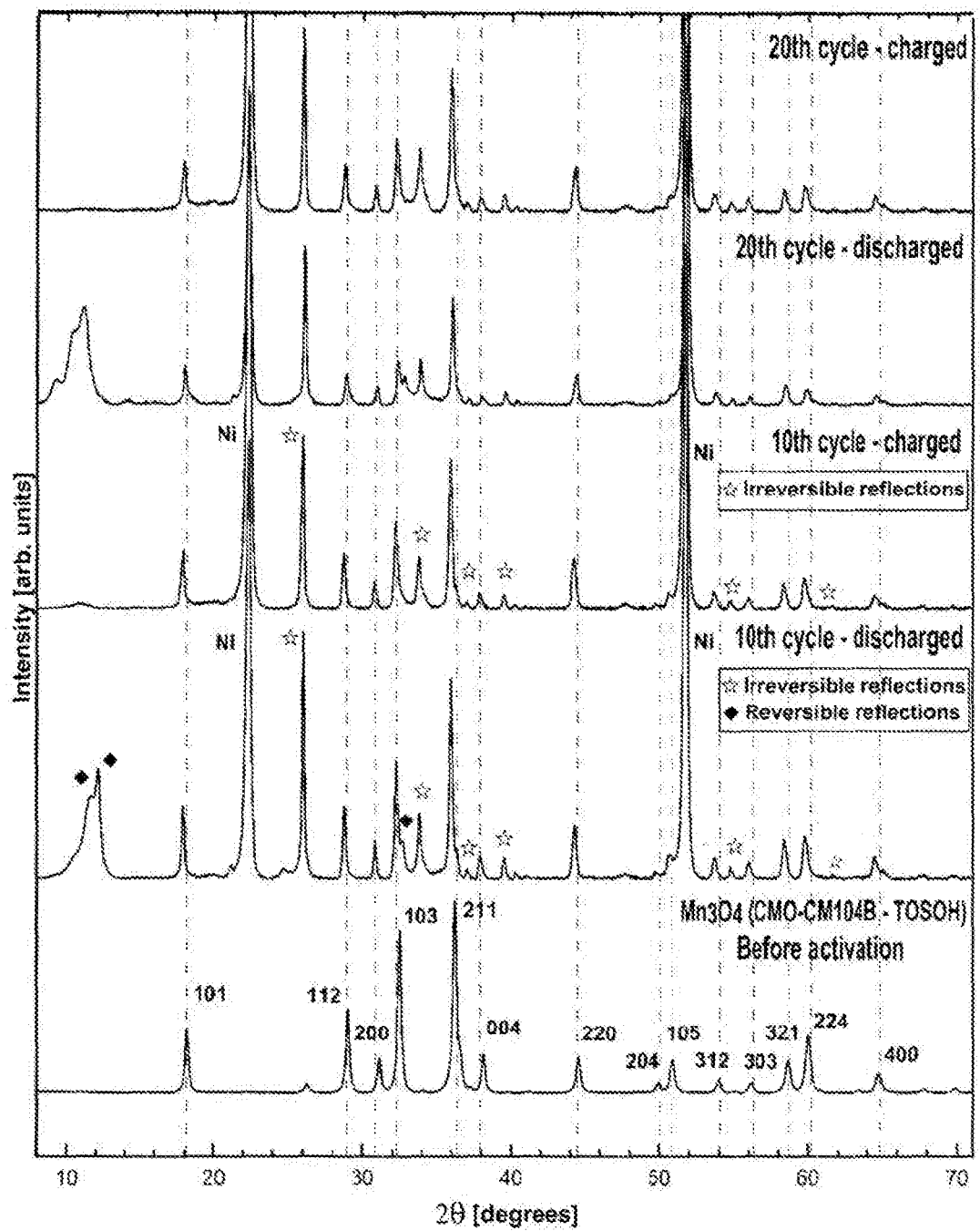
FIG. 6 comprises XRD patterns of: (i) a commercially available manganese oxide composition prior to cycling, (ii) a cycled composition at the discharged state of a $10^{th}$ battery cycle, the cycled composition resulting from cycling the manganese oxide composition; (iii) a cycled composition at the charged state of a $10^{th}$ battery cycle, the cycled composition resulting from cycling the manganese oxide composition; (iv) a cycled composition at a discharged state of the $20^{th}$ battery cycle, the cycled composition resulting from cycling the manganese oxide composition; and (v) a cycled composition at the charged state of a $20^{th}$ battery cycle, the cycled composition resulting from cycling the manganese oxide composition.

FIG. 6 shows the XRD patterns of: (i) $Mn_3O_4$ that has not undergone cycling; (ii) a cycled composition resulting from subjecting $Mn_3O_4$ to 10 cycles; and (iii) a cycled composition resulting from subjecting $Mn_3O_4$ to 20 cycles. Per FIG. 6, it can be seen that the cycling process leads to an appearance of several "new" Bragg peaks, and also appears to render some existing Bragg peaks reflections more pronounced. The presence of the $Mn_3O_4$ phase, albeit with a smaller tetragonal unit cell size (i.e. PDF 00-001-1127) is maintained. New reflections and pronounced reflections may be divided into two groups: (i) irreversible peaks, which means once they appear, they will remain present in both the charge and discharge states; and (ii) reversible peaks which are present only in the discharge state.

The irreversible peaks resulting from the cycling of $Mn_3O_4$ are listed in Table 2. In general, these peaks may be assigned to a PDF 03-065-2776 pattern, which suggests that an $Mn_3O_4$ composition with a tetragonal unit cell that is enlarged in the a axis direction may be produced and that, during the cycling process, the proportion of $Mn_3O_4$ phase having a larger unit cell (PDF 03-065-2776) may increase. In this example, the presence of zinc sulfate, which is believed to originate from $ZnSO_4$ electrolyte used in the battery, is also observed.

TABLE 2

| Irreversible Peaks after cycling (2θ (°)) |
|---|
| 25.96 (about 26) |
| 33.84 (about 34) |
| 37.70 |
| 39.48 (about 39.5) |
| 54.78 |
| 61.97 |

In some examples, other characteristics of cycled compositions include a Bragg peak at 34° that is greater in intensity than a Bragg peak at 18°. In some examples, other characteristics of cycled compositions include a Bragg peak at 36° is greater in intensity than a Bragg peak at 44°.

Figure 7:
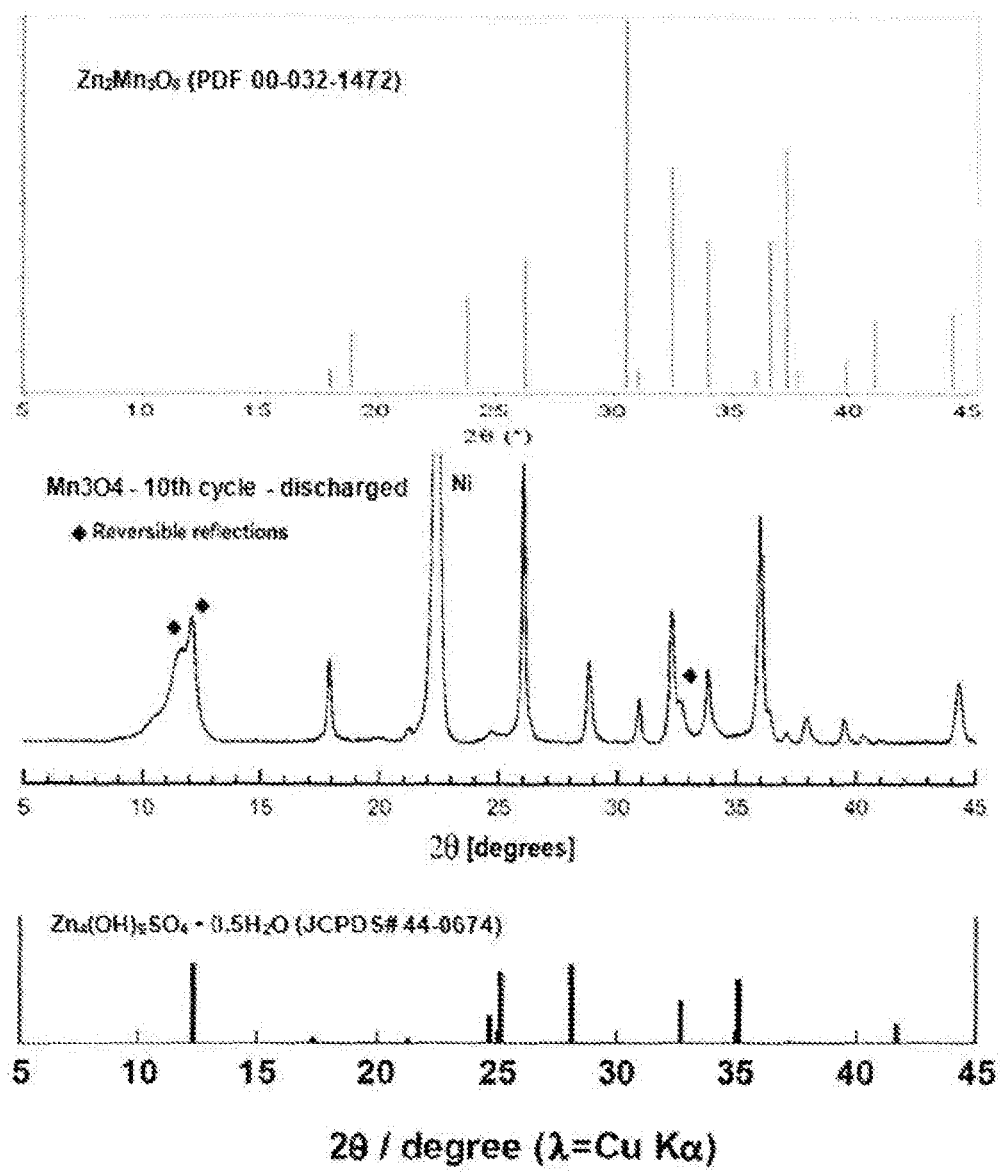
FIG. 7 comprises XRD patterns of: (i) $Zn_2Mn_3O_8$; (ii) a cycled composition at the discharged state of a $10^{th}$ battery cycle, the cycled composition resulting from cycling $Mn_3O_4$; and (iii) $Zn_4(OH)_6SO_4.0.5H_2O$.

FIG. 7 shows the XRD patterns of: (i) the discharged state of a cycled composition, the cycled composition resulting from cycling $Mn_3O_4$ for 10 cycles; (ii) $Zn_2Mn_3O_8$; and (iii) $Zn_4(OH)_6SO_4 \cdot 0.5H_2O$. The reversible Bragg peak at 2θ of 32.51° may be assignable to $Zn_2Mn_3O_8$ or $Zn_4(OH)_6SO_4 \cdot 0.5H_2O$ (JCPDS #44-0674). For example, it has been shown that $Zn_4(OH)_6SO_4 \cdot 0.5H_2O$ can be reversibly formed in similar systems (see Lee et al., ChemSusChem 2016, 9, 2948).

The presence of $Zn_2Mn_3O_8$ indicates that intercalation/deintercalation of Zn into and out of cycled composition resulting from $Mn_3O_4$ is possible. The position of Bragg peaks further suggests that the interplanar spacing of the atomic planes of the cycled composition change during discharge and charge states (see Table 3). For example, it is observed that d-spacing of planes in $Mn_3O_4$ or cycled composition thereof shrinks after discharge. Without being bound by theory, it is believed that a composition such as $Zn_\alpha Mn_2O_4$, wherein α<1, is formed during cycling: the direction of change in the d-spacing of such formed $Zn_\alpha Mn_2O_4$ is the same as that of $ZnMn_2O_4$ observed in the literature. It is also observed that the difference in d-spacing between charge and discharge increases with cycling, which suggests that during these cycling steps, more Zn is introduced into the manganese oxide composition or cycled composition thereof as the cycling proceeds.

TABLE 3

| | Crystal plane | Difference in interplanar distance (Å) |
|---|---|---|
| Difference between charged and discharged state at $20^{th}$ cycle ($d_{ch} - d_{disch}$) | 211 (PDF 03-065-2776) | 0.010 |
| | 211 (PDF 00-001-1127) | 0.005 |
| | 103 | 0.006 |
| | 220 | 0.003 |
| Difference between charged and discharged state at $10^{th}$ cycle ($d_{ch} - d_{disch}$) | 211 (PDF 03-065-2776) | 0.006 |
| | 211 (PDF 00-001-1127) | 0.003 |
| | 103 | 0.004 |
| | 220 | 0.003 |

$Mn_3O_4$ (before cycling) and a cycled composition resulting from subjecting $Mn_3O_4$ to 50 cycles, in a zinc salt electrolytic solution, are characterized and analyzed using X-ray Photoelectron Spectroscopy (XPS) (Kratos Analytical, Axis Ultra DLD Model). XPS survey spectrum of $Mn_3O_4$ prior to cycling (see FIG. 8(a)—solid line) indicates the presence of Mn and O in the chemical composition of the $Mn_3O_4$. XPS survey spectrum of a cycled composition resulting from subjecting $MnO_4$ to 50 cycles (see FIG. 8(b)—stippled line) indicates the presence of Zn, Mn, and O in the chemical composition of the cycled composition.

Figure 8A:
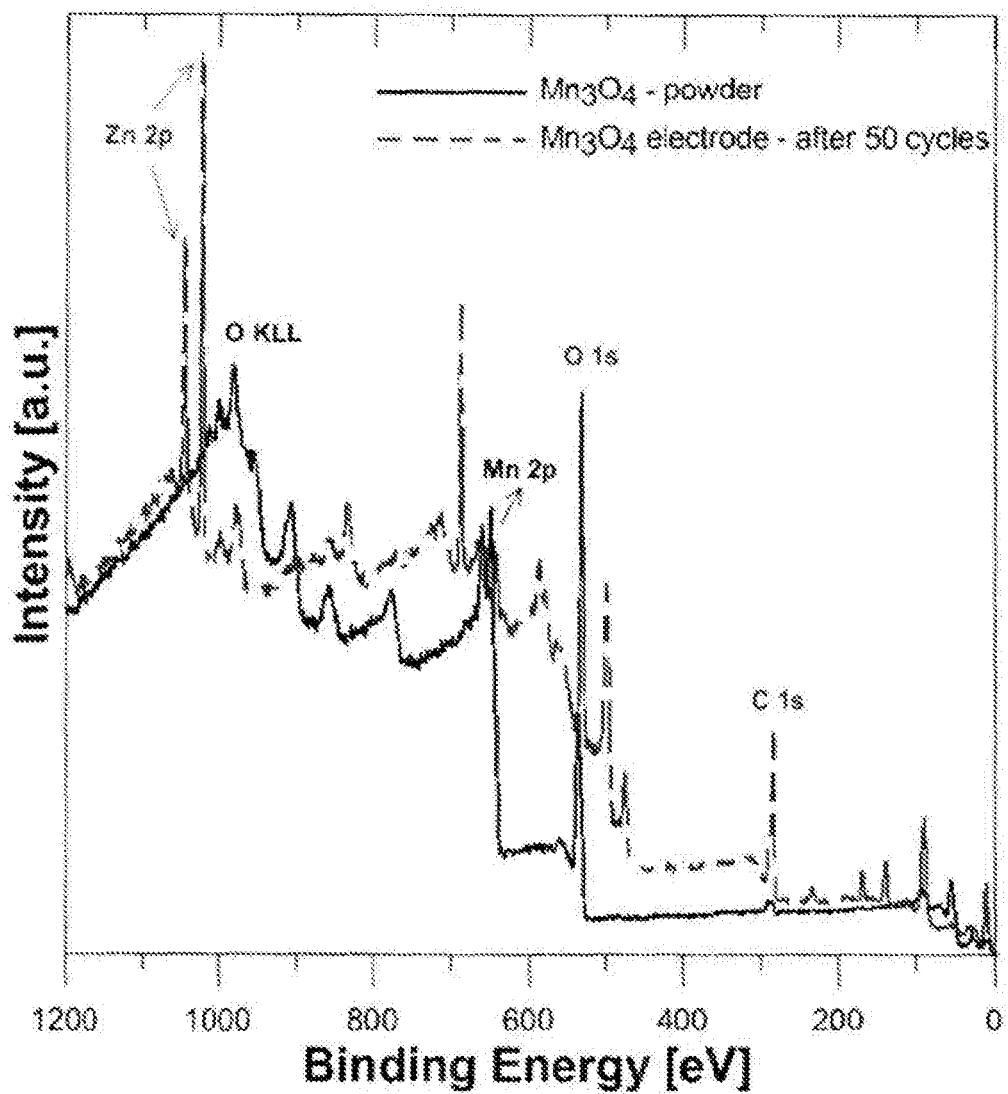
FIG. 8(a) contains x-ray photoelectron spectroscopy (XPS) spectra of: (i) $Mn_3O_4$ powder; and (ii) a cycled electrode after 50 discharge and charge cycles, the cycled electrode resulting from cycling an electrode initially comprising $Mn_3O_4$ as an active material.
Figure 8B:
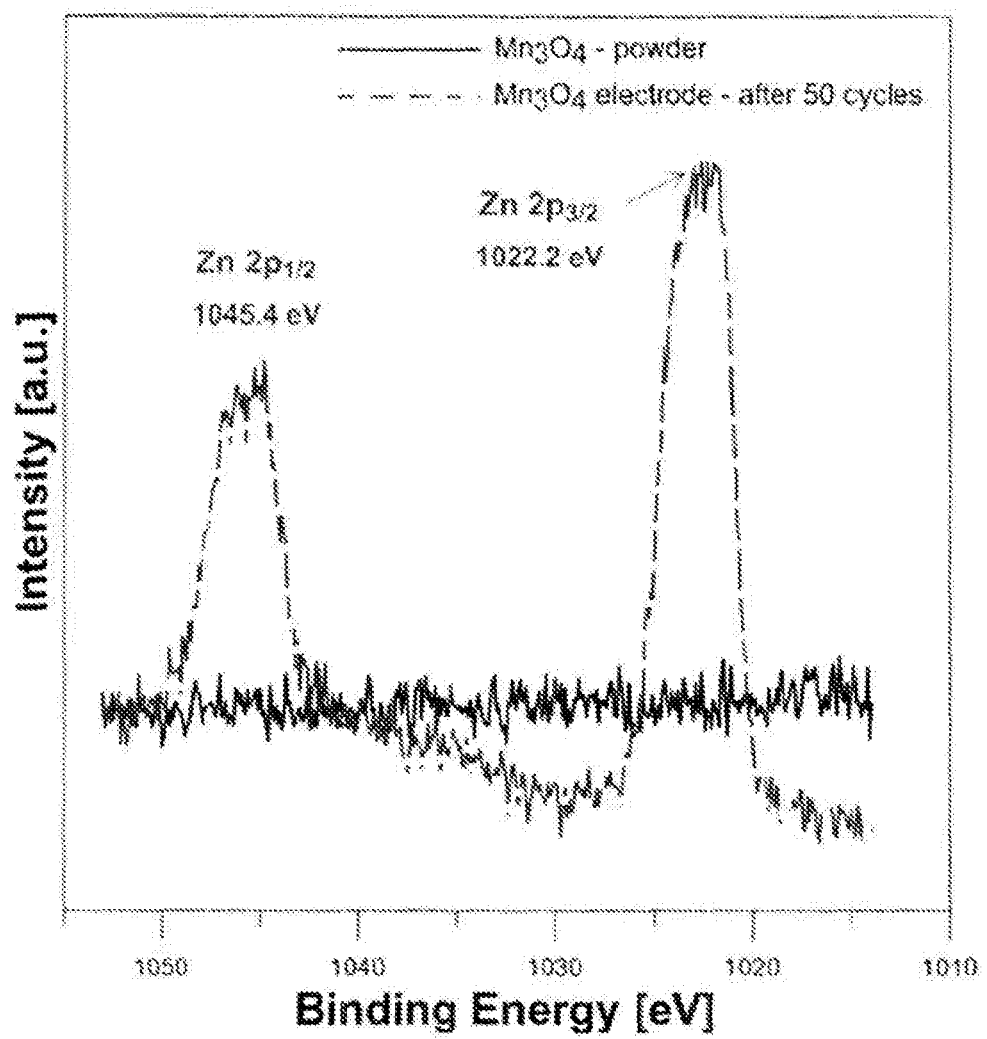
FIG. 8(b) is a high resolution magnification of a portion of a portion of the XPS spectrum of the cycled electrode in FIG. 8(a), the high resolution magnification indicating the formation of a $Zn_xMn_yO_z$ species as a result of subjecting the electrode initially comprising $Mn_3O_4$ to discharge and charge cycling.

A high resolution spectrum of the region identified as "Zn 2p" in FIG. 8(a) is provided in FIG. 8(b), and indicates the presence of Zn in the chemical composition of the cycled composition. It is hypothesized that a composition such as, but not limited to, $Zn_2Mn_3O_8$, $ZnMn_2O_4$, or $Zn_4(OH)_8SO_4.5H_2O$ may be formed in the charged state as a result of subjecting $Mn_3O_4$ to a battery discharge and charge cycling process. It is also hypothesized that intercalation and deintercalation of $Zn^{2+}$ into and out of the cathodic active material may be responsible for the overall capacity of a battery. A cycling process leading to an increase of initial capacity of a battery may lead to a transformation of $MnO_3O_4$ with smaller tetragonal unit cell size to $Mn_3O_4$ with a larger tetragonal unit cell.

Example 2: $LiMn_2O_4$

An example of a manganese oxide composition is chemically treated $LiMn_2O_4$.

Chemically treated $LiMn_2O_4$ is prepared according to the process described above.

Batteries comprising chemically treating $LiMn_2O_4$ as an active material are prepared according to the process described above. Details of each of the prepared batteries are provided in Table 4 as follows:

TABLE 4

| Cell ID | Manganese oxide composition | Loading at the Cathode (mg cm$^{-2}$) | Electrolyte | Discharge cut-off step |
|---|---|---|---|---|
| ISA57-04 | Chemically treated $LiMn_2O_4$ | 1.5 | 2M $ZnSO_4$ | 1.1 V |
| FCB123-01 | $LiMn_2O_4$ | 3.4 | 2M $ZnSO_4$ | 1.1 V |

Figure 9A:
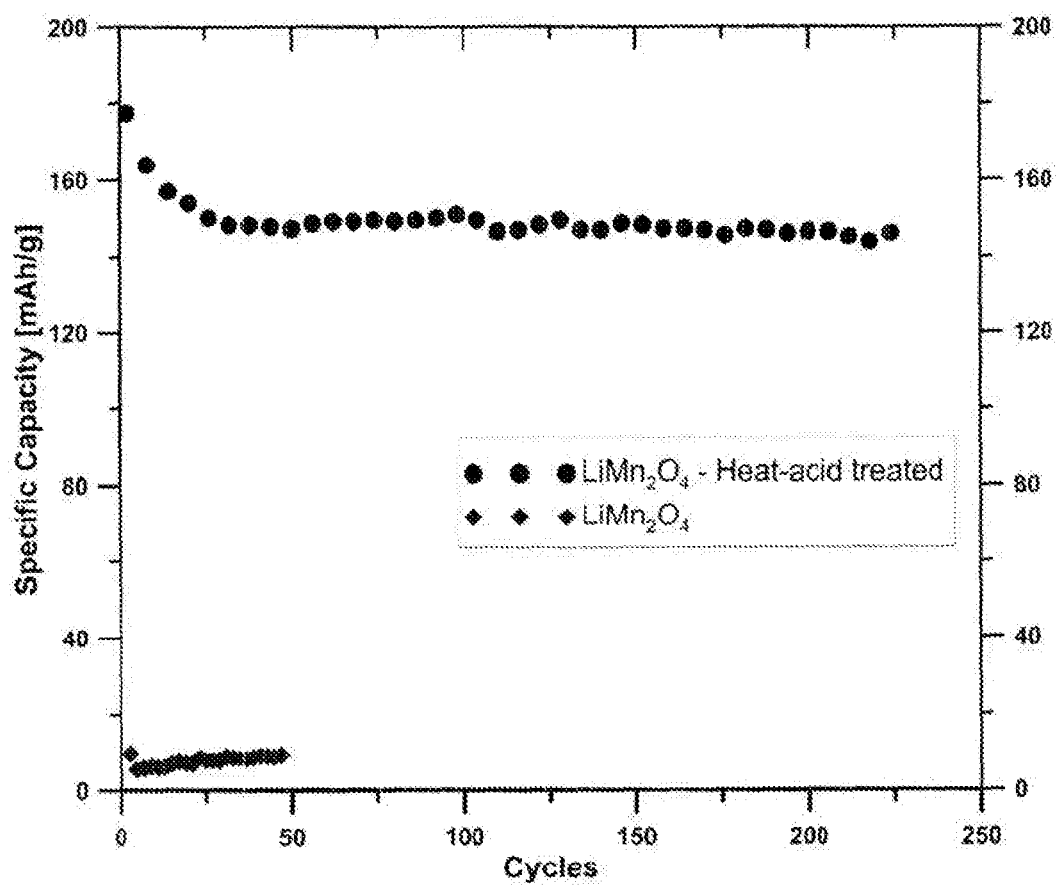
FIG. 9(a) is a comparison of the specific capacities (after certain numbers of cycling) of: (i) a battery initially comprising an activated composition resulting from a treatment of $LiMn_2O_4$; versus (ii) a battery initially comprising $LiMn_2O_4$ that has not been treated.

Referring to FIG. 9(a), the specific capacity of: (i) a battery initially comprising chemically treated $LiMn_2O_4$, the batteries having been subjected to cycling (referred to as "Battery A" in this example); and (ii) a battery initially comprising $LiMn_2O_4$, that had not been treated, the batteries having been subjected to cycling (referred to as "Battery B: in this example); are compared. As shown in FIG. 9(a), the specific capacity of Battery A remains generally constant at about 150 mAh/g over about 230 cycles. The specific capacity of Battery B, however, is not high.

Figure 9B:
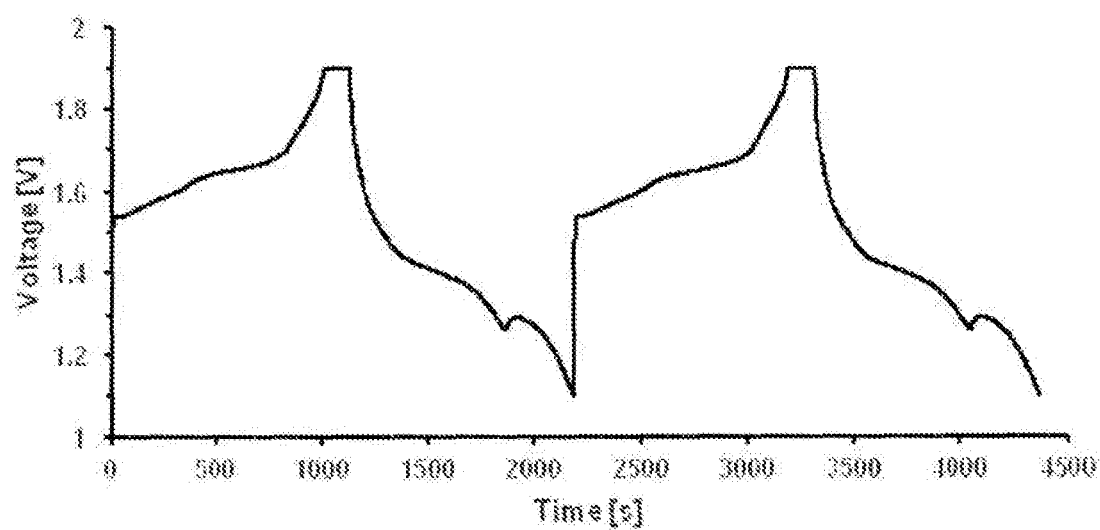
FIG. 9(b) is a representation of the charging/discharging curves, during the $228^{th}$ and $229^{th}$ cycles of a prescribed discharge/charge process, of the battery initially comprising an activated composition resulting from a chemical treatment of $LiMn_2O_4$ as described in FIG. 9(a).

Referring to FIG. 9(b), the charging/discharging curves during 228th and 229th discharge/charge cycles of a Battery A are provided. The profiles are substantially similar even after subjecting Battery A to multiple discharge/charge cycles.

Figure 9C:
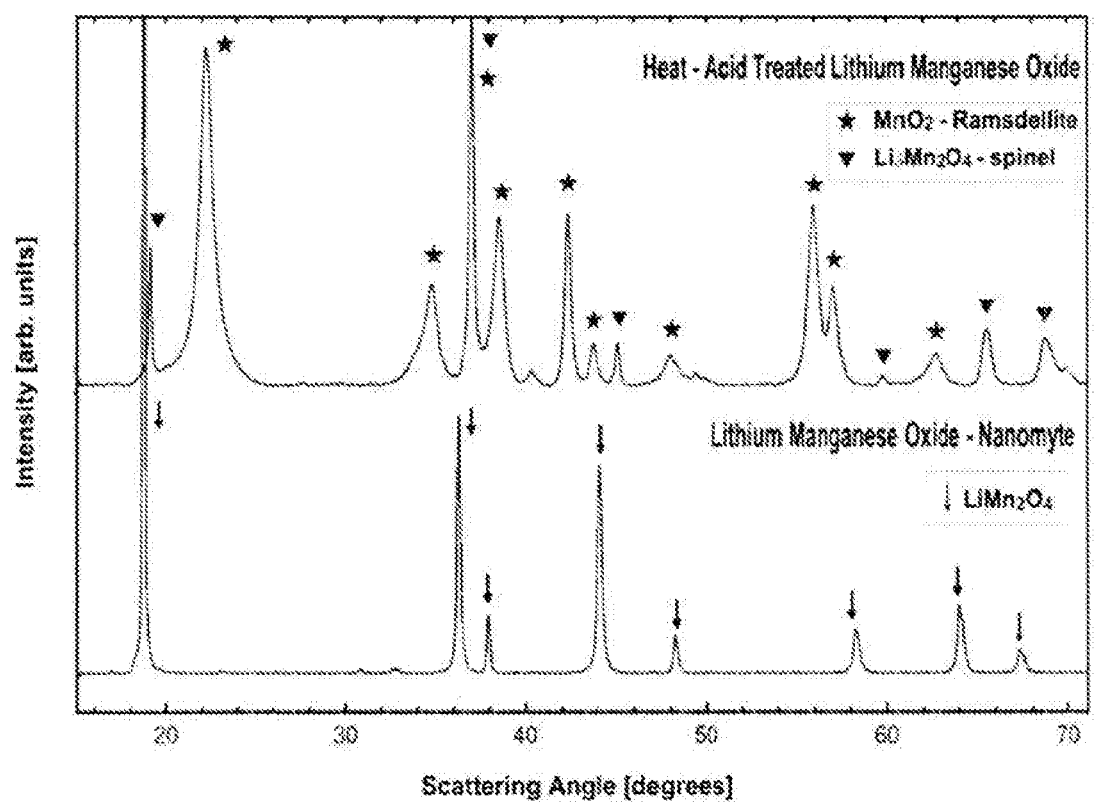
FIG. 9(c) comprises XRD patterns of $LiMn_2O_4$ that has not been treated and an activated composition resulting from a treatment of $LiMn_2O_4$.

Referring to FIG. 9(c), the XRD patterns of $LiMn_2O_4$ prior to chemical treatment and $LiMn_2O_4$ after chemical treatment are provided. After treatment, a ramsdellite phase of $MnO_2$ and a $Li_\delta Mn_2O_4$ phase (e.g. having a spinel crystalline structure) are introduced into the activated composition resulting from chemically treating $LiMn_2O_4$, where δ has an expected value of: $0.01<\delta<1$. For example, δ may be between $0.1<\delta<1$, $0.2<\delta<1$, $0.25<\delta<1$. In other examples, pure ramsdellite may be achievable with amendments to the chemical treatment process of $LiMn_2O_4$.

General:

It is contemplated that any part of any aspect or embodiment discussed in this specification may be implemented or combined with any part of any other aspect or embodiment discussed in this specification. While particular embodiments have been described in the foregoing, it is to be understood that other embodiments are possible and are intended to be included herein. It will be clear to any person skilled in the art that modification of and adjustment to the foregoing embodiments, not shown is possible.

Unless defined otherwise, all technical and scientific terms used herein have the same meaning as is commonly understood by one of ordinary skill in the art to which this invention belongs. In addition, any citation of references herein is not to be construed nor considered as an admission that such references are prior art to the present invention.

The scope of the claims should not be limited by the example embodiments set forth herein, but should be given the broadest interpretation consistent with the description as a whole.

What is claimed is:

1. A zinc-manganese battery comprising a cathode, an anode, and an electrolytic solution in fluid communication with the cathode and the anode, the cathode comprising a manganese oxide composition having an X-ray diffractogram pattern expressing a Bragg peak at 26°±0.5° and 36°±0.5°, the Bragg peak at 26°±0.5° being of greatest intensity in comparison to other expressed Bragg peaks.

2. The battery according to claim 1, the X-ray diffractogram pattern of the manganese oxide composition further expressing Bragg peaks at 18°±0.5° and 34°±0.5°.

3. The battery according to claim 2, wherein the Bragg peak at 34°±0.5° is greater in intensity than the Bragg peak at 18°±0.5°.

4. The battery according to claim 2, the X-ray diffractogram pattern of the manganese oxide composition further expressing a Bragg peak at 44°±0.5°.

5. The battery according to claim 1, the X-ray diffractogram pattern of the manganese oxide composition further expressing a Bragg peak at 44°±0.5°.

6. The battery according to claim 5, wherein the Bragg peak at 36°±0.5° is greater in intensity than the Bragg peak at 44°±0.5°.

7. The battery according to claim 1, wherein the manganese oxide composition is at least 50% $Mn_3O_4$.

8. The battery according to claim 1, wherein reversible reflections at a Bragg peak range of between 8°±0.5° and 12°±0.5° are expressed in the battery.

9. The battery according to claim 1, wherein the electrolytic solution is neutral.

10. A method comprising:
   (a) providing the battery of claim 1; and
   (b) cycling the battery by:
      (i) galvanostatically discharging the battery to a first $V_{cell}$;
      (ii) galvanostatically charging the battery to a second $V_{cell}$; and
      (iii) potentiostatically charging at the second $V_{cell}$ for a first defined period of time.

11. The method according to claim 10, wherein the first $V_{cell}$ is between 1.0V and 1.2V.

12. The method according to claim 10, wherein the second $V_{cell}$ is between 1.8V and 2.0V.

13. The method according to claim 10, further comprising potentiostatically charging the battery at a third $V_{cell}$ for a second defined period of time, said potentiostatic charging at the third $V_{cell}$ occurring after galvanostatically discharging the battery to the first $V_{cell}$ and before galvanostatically charging the battery to the second $V_{cell}$.

14. The method according to claim 13, wherein the third $V_{cell}$ is between 1.7V and 1.8V.

15. The method according to claim 10, wherein the manganese oxide composition is at least 50% $Mn_3O_4$.

* * * * *